Figure 1:
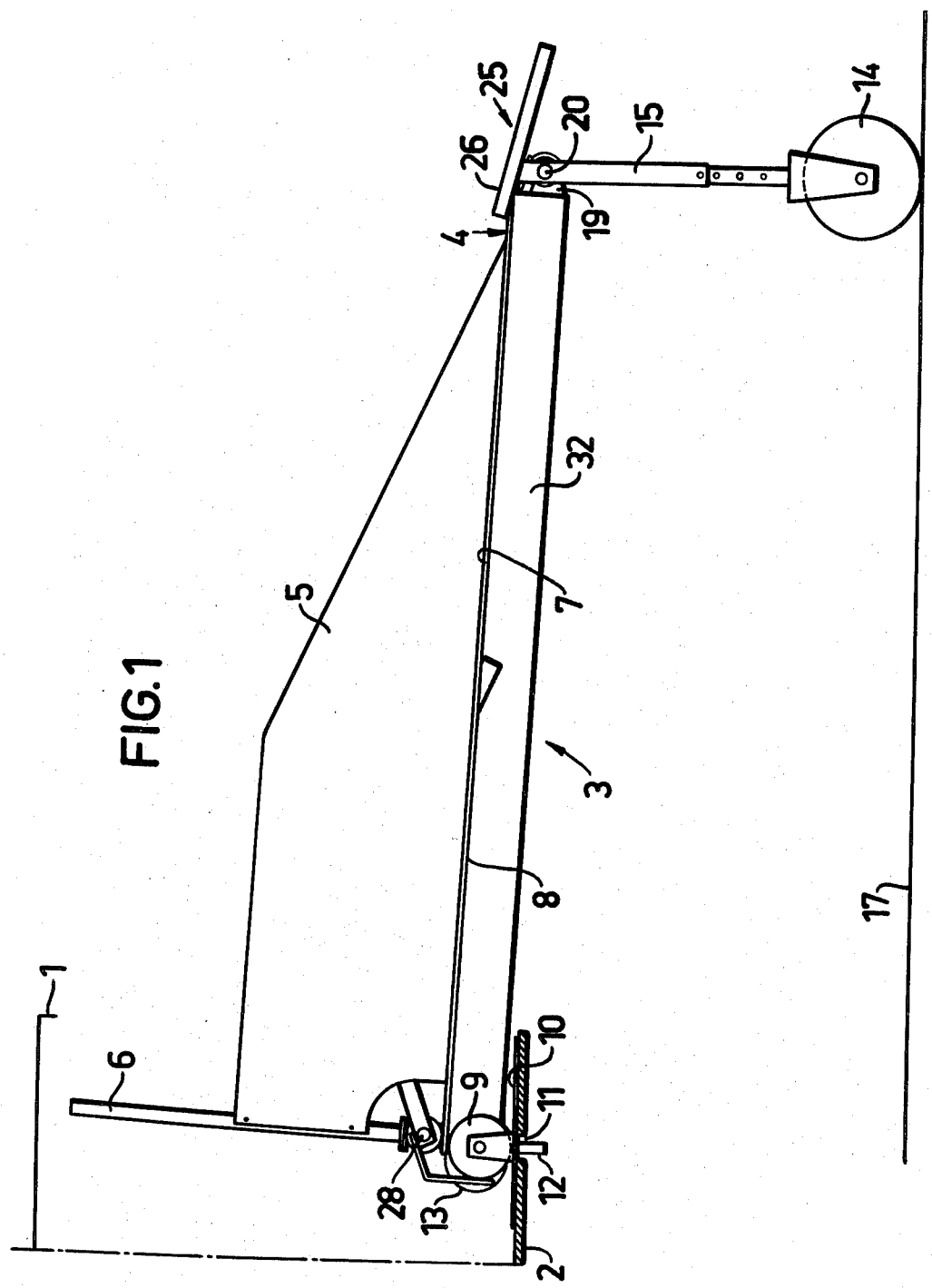

United States Patent [19]

Lindskog

[11] 4,316,687

[45] Feb. 23, 1982

[54] LOAD CARRYING DEVICE

[76] Inventor: Kjell Lindskog, 27 Floravägen, Skellefteå, Sweden, S-931 39

[21] Appl. No.: 124,547

[22] Filed: Feb. 25, 1980

[30] Foreign Application Priority Data

Mar. 1, 1979 [SE] Sweden ............................. 7901869

[51] Int. Cl.³ ............................................... B60P 1/64
[52] U.S. Cl. ...................................... 410/92; 280/43; 410/67; 410/77; 414/498
[58] Field of Search ................ 414/498, 522; 280/43; 410/3, 51, 66, 67, 92, 77

[56] References Cited

U.S. PATENT DOCUMENTS

| 2,565,820 | 8/1951 | Machanic | 414/498 X |
| 2,656,942 | 10/1953 | Helms | 414/498 |
| 3,409,154 | 11/1968 | Rasmussen | 414/498 |
| 3,883,020 | 5/1975 | Dehn | 414/498 |
| 3,972,427 | 8/1976 | Stanley et al. | 414/498 X |

Primary Examiner—Robert G. Sheridan
Attorney, Agent, or Firm—Burns, Doane, Swecker & Mathis

[57] ABSTRACT

An improved movable load carrying device for vehicles with cargo space is disclosed. Such load carrying devices render possible loading and unloading operations from three sides and with suitable working positions of the operator, but on the other hand it was found, that the inward as well as the outward movement of known load carrying devices into and, respectively, out of the cargo space of a vehicle are troublesome and require relatively great exertion and often even heavy lifting, which to some extent takes away the advantages with respect to loading and unloading. In order to eliminate these and other disadvantages, according to the present invention a movable load carrying device is proposed the load table of which is formed on its lower surface with guide grooves for a pair of carrying rollers. The carrying rollers are mounted in the rear portion of the cargo space and capable together with the wheels of the support legs to movably support the load table as long as the center of gravity of the load table is located outside the carrying rollers, and together with rollers provided at the forward portion of the load table, seen in the inward movement direction, to movably support the load table as long as the center of gravity of the table is located inside the carrying rollers.

8 Claims, 6 Drawing Figures

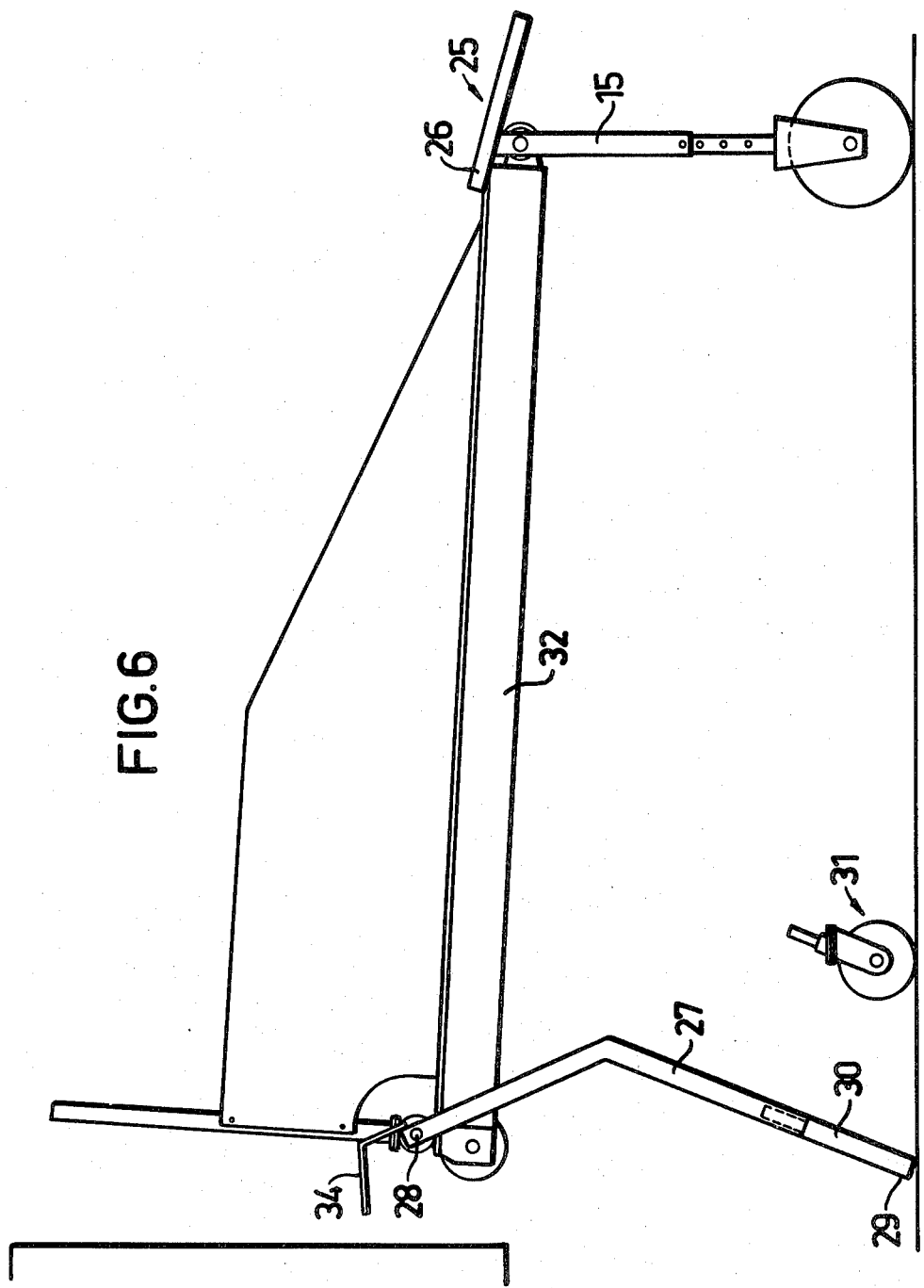

LOAD CARRYING DEVICE

This invention relates to a movable load carrying device for vehicles with cargo space, for example vehicles of the type station wagon, combination cars, vans, busses, trucks with covered cargo space, trailers with or without a super-structure etc., which load carrying device comprises a load table, which is supported on rollers and can be moved into and removed from the cargo space of the vehicle, and which at its rear, seen in the direction of inward movement, is provided with pivotal support legs on wheels for supporting said rear portion on the ground at least when the load carrying device is being moved into and removed from the cargo space of the vehicle.

Such load carrying devices are previously known and utilized to facilitate the loading and unloading of goods on and, respectively, from vehicles of the aforesaid type, the cargo space of which is accessible only with difficulty and normally can be approached only from one side. The loading and unloading on and, respectively, from such vehicles, therefore, is troublesome and normally involves unsuitable working positions of the operator, implying bent backs and arms stretched far forward, or crawling into the cargo space, whereby the working position is not improved but rather worsened.

A movable load carrying device, however, renders it possible to load and unload from three sides and with suitable working positions. On the other hand, however, the known load carrying devices have proved difficult to be moved in and out of the cargo space. They require great exertion and often even heavy lifting, so that the advantage of movable load carrying devices with respect to loading and unloading operations is taken away to a certain extent.

A further disadvantage of known load carrying devices, which normally are provided on their lower surface with at least two pairs of rollers, is that the rollers require guide rails, which must rapidly be mounted in the cargo space of the vehicle. This requires relatively substantial encroaching on the vehicle in order to render the vehicle capable at all to be equipped with a movable load carrying device of known type. The rigidly mounted guide rails, moreover, constitute a substantial obstacle to the possibility of rapid conversion of the vehicle from goods to passenger transport, and vice versa. This applies particularly to combination cars and the like, in which the back rest of the rear seat is folded down to provide maximum cargo space, and in which the guide rails first must be removed for being able to again fold up the back rest and, respectively, the guide rails must be mounted to permit the load carrying device being moved into the cargo space.

The present invention, therefore, has the object to produce a load carrying device of the kind above referred to, which does not show the aforesaid drawbacks, but even in fully loaded state is easily movable in and out of the cargo space without requiring great exertion and heavy lifting, and for the installation and utilization of which in a vehicle no appreciable encroaching on the vehicle nor rigidly mounted guide rails are required.

This object is achieved, in that the load carrying device according to the present invention has been given the characterizing features defined in the attached claims, by which features also the desire of obtaining a load carrying device is realized, which can be parked or detached and which without being lifted manually can easily be moved into and removed from the cargo space of a vehicle.

Figure 2:
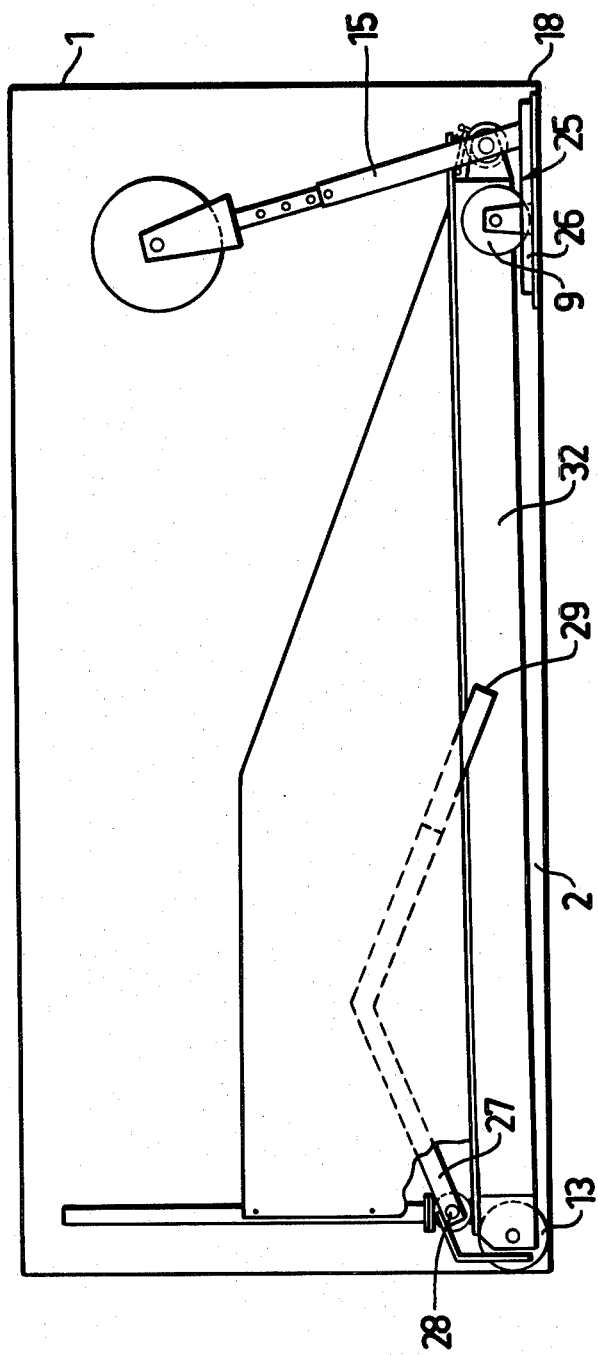
Figure 3:
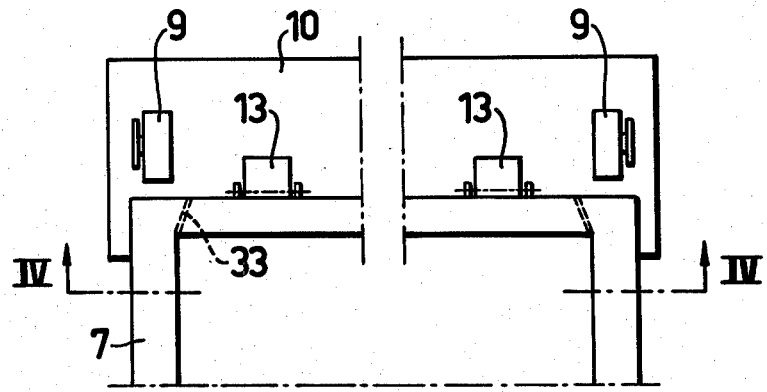
Figure 4:
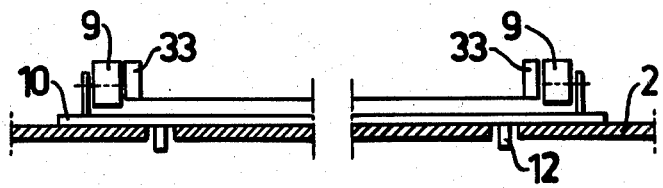
Figure 5:
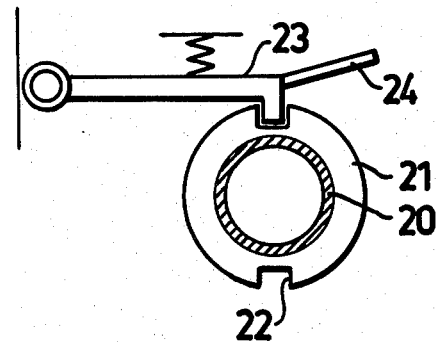

The invention is described in greater detail in the following, with reference to the accompanying drawings, in which FIG. 1 is a lateral view of a preferred embodiment of the load carrying device according to the present invention in a position, in which the load carrying device is removed from the cargo space of a vehicle, FIG. 2 is a lateral view of the same load carrying device in a position moved into the cargo space or in transport position within the cargo space of the vehicle, FIG. 3 is a schematic view from above for illustrating certain details of the load carrying device, FIG. 4 is a section along substantially the line IV—IV in FIG. 3, FIG. 5 shows a locking means comprised in the load carrying device, and FIG. 6 is a lateral view of the load carrying device in a detached or parked position.

The reference numeral 1 in the drawings designates an only schematically indicated cargo space, for example in a station wagon or combination car, with a floor 2. The numeral 3 designates a load carrying device according to the invention for the cargo space 1.

The load carrying device 3 comprises a load table or load frame 4 with a fixed or detachable box bottom, detachable side members 5 and a load defining protection 6, which is provided at the forward end of the frame in order to prevent cargo on the load table from being thrown forward, for example at sudden braking.

The load frame or table 4, the cross-section of which is apparent from FIG. 4, is provided with longitudinal lateral flanges 7, the lower surface of which form run surfaces 8 for rollers 9 provided in the rear portion of the cargo space. Said rollers are shown located on a common plate 10 abutting the cargo space floor 2, which plate is held in place by pins 12, which extend through preferably reinforced holes 11 in the floor 2. Besides said holes, no other steps or encroaching measures are required for installing and applying the load carrying device according to the present invention in a vehicle.

The load carrying device is provided at its forward end with two rollers 13 rigidly mounted on the frame 4, which rollers are intended to run directly on the floor 2 of the cargo space, and at its opposite end with a pair of preferably extendible support legs 15 provided with wheels 14, which support legs are intended to support the load carrying device on the ground at least when the load carrying device is being moved into and removed from the cargo space 1, as shown in FIG. 1.

In the removed position shown in FIG. 1, where the load carrying device can be loaded and/or unloaded from three sides, and from which position the load carrying device can be moved into the cargo space 1, the load carrying device is supported on the rollers 9 abutting the run surfaces 8 and on the wheeled support legs 15, the length of which should be shorter than the distance from the floor of the cargo space to the ground 17. When, thus, the load carrying device with or without cargo is being moved into the cargo space 1, the device rolls on the rollers 9 and the wheels 14 of the support legs until the load carrying device with its centre of gravity passes the rollers 9, whereafter the load carrying device is overbalanced and during its continued inward movement is supported on the rollers 13, which roll directly on the floor, and on the rollers 9 abutting the run surfaces 8.

Due to overbalancing of the load carrying device when it with its centre of gravity passes the rollers 9, the hinged support legs 15 are relieved from load and easily can be pivoted upward to the position shown in FIG. 2 for moving the load carrying device all the way into the cargo space and past the rear edge 18 thereof.

The support legs, more precisely, are connected to an axle 20, which is rotatably mounted in bearing brackets 19 at the rear end of the load frame. On this axle, a sleeve (see FIG. 5) with two locking grooves 22 is rigidly attached for co-operation with a locking pawl 23, which is spring-loaded in the direction to the axle and pivotally attached on the frame. Said pawl, when engaging with one locking groove 22, locks the support legs 15 in the folded-down position shown in FIG. 1, and, when engaging with the second locking groove 22, locks the support legs 15 in the folded-up position shown in FIG. 2. Due to being spring-loaded, the locking pawl automatically engages with the locking groove 22 in question when the support legs 15 assume one of the said positions. In order to facilitate the disengagement of the locking pawl from a locking groove, the pawl is provided with a projecting lip 24. Each support leg 15 is provided at its end remote from the wheel 14 with a pedal and handle rod or plate 25 acting as a lever, which upon the upward pivotal movement of the support legs 15 lifts with its portion 26 the load carrying device 3 from the rollers 9 and moves the device inward through the very last distance. When the support legs 15 have been pivoted upward entirely, i.e. when they are in the position shown in FIG. 2, they rest with their foot-plates directly against the floor 2 of the cargo space, thereby maintaining the load carrying device lifted from the rollers 9 and locked during the transport.

When the load carrying device is to be moved out of the cargo space, first the locking pawl 20 is disengaged so that the support legs 15 can be folded down to the position shown in FIG. 1, in which they automatically are locked by the locking pawl. The folding down of the support legs 15 also implies that the load carrying device automatically is displaced slightly in rearward direction and is lowered onto the rollers 9. The load carrying device then easily can be pulled out of the cargo space, first on the rollers 9 and 13 and thereafter on the rollers 9 and the support leg wheels 15.

The embodiment of the load carrying device according to the present invention as shown in the drawings also is equipped with a pair of parking legs 27 rendering it possible to park the load carrying device directly on the ground. The parking legs 27 are connected to an axle 28, which is rotatably mounted at the forward end of the load frame and provided with the same locking means as the axle 20 of the support legs for locking the parking legs 27 in their upward pivoted position, as shown in FIGS. 1 and 2, and in their downward pivoted position, in which they support the load carrying device, as shown in FIG. 6. The legs 27 are bent angularly to permit the vehicle to be backed as closely as possible to the forward end of the load carrying device, and their effective length shall be greater than the distance from the floor 2 of the cargo space to the ground, so that the forward end of the load carrying device automatically is lifted up from the rollers 9 by means of the parking legs when the load carrying device is pulled out of the cargo space 1 after the legs 27 were folded down from the position shown in FIG. 2 to a position abutting the ground. The legs 27, thus, with their free ends 29 firmly engage with the ground and will be pivoted upward about these ends to the position shown in FIG. 6 when the load carrying device is pulled out from the cargo space 1. In this position the load carrying device is supported on its legs 15 and 27.

In order to render it possible to move the load carrying device on the ground or within a room, the lower portion 30 of the parking legs can be exchanged against a pivot wheel 31 shown in FIG. 6.

For moving a parked load carrying device into the cargo space of a vehicle, the load carrying device is moved against the vehicle, whereby the parking legs 27 pivot about their free end and so to say lift the forward end of the load carrying device into the cargo space and lower said end onto the rollers 9. In order in this connection to automatically guide the load carrying device inward in relation to the rollers 9, the sides 32 of the load carrying device which are formed as guide rails for the rollers 9, are bent inward at their forward end, as shown at 33 in FIG. 3. When the parking legs 27 have been relieved from their load, they are pivoted upward to the position shown in FIG. 2. Grapples 34 connected to the parking legs are thereby caused to engage each behind a roller 9 and to pull the load carrying device onto the rollers 9. The load carrying device can thereafter be moved into the cargo space in the manner described above.

The present invention is not restricted to the embodiment described above and shown in the drawings, but can be altered and modified in many different ways within the scope of the invention idea defined in the claims. The load carrying device, for example, intended for permanent use in a cargo space need not be provided with parking legs, and the load table proper can be designed so as to fit special cargo.

What I claim is:

1. A manually movable load carrying device for vehicles with cargo space, comprising a load table, rollers rotatably mounted on a forward portion of the load table for aiding movement of the load table into and out of the cargo space of the vehicle, pivotal support legs having wheels provided at a first end and being pivotally mounted at a rear end of the load table for pivoting between a transport position and a position for supporting a rear portion of the load table at least when the load carrying device is being moved into and removed from the cargo space of the vehicle, said support legs being pivotable to the support position when the load table is substantially contained within the cargo space, guide grooves formed on a lower surface portion of the load table, carrying rollers mounted in a rear portion of the cargo space and adapted to engage the guide grooves, the support legs having a length which is less than the distance from the floor of the cargo space to the ground in order to effect overbalancing of the load table in relation to the carrying rollers when the center of gravity of the load table passes said rollers, said carrying rollers being capable together with the wheels of the support legs to movably carry the load table as long as the center of gravity of the load table is located between the wheels and the carrying rollers and together with the rollers provided at the forward portion of the load table to movably carry the load table as long as the center of gravity of the table is located between the load table rollers and the carrying rollers.

2. The load carrying device as defined in claim 1, wherein each of the pivotal support legs is provided at its end remote from the wheel with foot means spaced from the pivotal axis of the support leg, said foot means upon upward pivotal movement of the support legs to the transport position lifts the load table upwardly away from the carrying rollers and into the cargo space, the support legs in the transport position resting with the foot means against the floor of the cargo space and carrying the load carrying device lifted away from the carrying rollers.

3. The load carrying device as defined in claim 1, further comprising locking means for locking the support legs in their different positions.

4. The load carrying device as defined in claim 1, wherein the carrying rollers are mounted on a common plate by locking pins extending through holes in the floor of the cargo space.

5. The load carrying device as defined in claim 1, wherein the guide grooves widen in a direction toward the forward end of the load table to facilitate guiding the load table inwardly in relation to the carrying rollers.

6. The load carrying device as defined in claim 1, further comprising parking legs provided at the forward end of the loading table, said parking legs having a length exceeding the distance from the floor of the cargo space to the ground in order upon pulling out movement of the load carrying device to lift the load table upwardly away from the carrying rollers.

7. The load carrying device as defined in claim 6, wherein the parking legs are provided at one end with grapples capable upon upward pivotal movement of the parking legs to a transport position to engage the floor of the cargo space behind the carrying rollers for pulling the load carrying device into the cargo space.

8. The load carrying device as defined in claim 5 or 7, wherein the parking legs are angularly bent.

* * * * *